United States Patent
Webb

(10) Patent No.: US 8,939,710 B2
(45) Date of Patent: Jan. 27, 2015

(54) ROTATING TURBOMACHINE SEAL

(75) Inventor: Scot A. Webb, Gales Ferry, CT (US)

(73) Assignee: United Technologies Corporation, Hartford, CT (US)

(*) Notice: Subject to any disclaimer, the term of this patent is extended or adjusted under 35 U.S.C. 154(b) by 660 days.

(21) Appl. No.: 13/217,210

(22) Filed: Aug. 24, 2011

(65) Prior Publication Data
US 2013/0051993 A1 Feb. 28, 2013

(51) Int. Cl.
*F01D 11/00* (2006.01)
*F16J 15/16* (2006.01)

(52) U.S. Cl.
CPC .............. *F01D 11/005* (2013.01); *F16J 15/164* (2013.01)
USPC ............................ 415/111; 415/113; 415/230

(58) Field of Classification Search
CPC .... F01D 11/003; F04D 29/12; F05D 2240/55
USPC ........................ 415/111, 113, 174.2, 230, 231; 416/174; 277/339, 447, 455, 579
See application file for complete search history.

(56) References Cited

U.S. PATENT DOCUMENTS

| 3,463,498 A | 8/1969 | Bill |
| 3,905,730 A | 9/1975 | Ruf |
| 3,909,015 A | 9/1975 | Kasahara |
| 4,362,135 A | 12/1982 | Irimajiri |
| 4,397,471 A | 8/1983 | Feldman et al. |
| 4,539,895 A | 9/1985 | Tanaka et al. |
| 4,750,746 A | 6/1988 | Boudot et al. |
| 5,292,138 A * | 3/1994 | Glynn et al. .................. 277/422 |
| 5,924,844 A * | 7/1999 | Cybularz et al. .............. 415/115 |
| 6,393,331 B1 * | 5/2002 | Chetta et al. ..................... 700/97 |
| 7,563,079 B2 | 7/2009 | Aguilar |
| 2005/0242519 A1 | 11/2005 | Koleilat et al. |
| 2009/0224484 A1* | 9/2009 | Chochua ....................... 277/411 |

FOREIGN PATENT DOCUMENTS

| GB | 718142 | 11/1954 |
| GB | 1247968 | 9/1971 |
| WO | 2010030448 | 3/2010 |

OTHER PUBLICATIONS

European Search Report for European Application No. 12181554.2-2321 dated Nov. 23, 2012.

* cited by examiner

*Primary Examiner* — Nathaniel Wiehe
*Assistant Examiner* — Adam W Brown
(74) *Attorney, Agent, or Firm* — Carlson, Gaskey & Olds, P.C.

(57) ABSTRACT

An exemplary turbomachine seal assembly includes a ring seal that has a radially-facing sealing surface, an axially-facing sealing surface, and a first tapered surface. The turbomachine seal assembly also includes a spacer that has a second tapered surface. The second tapered surface interfaces with the first tapered surface to bias the radially facing sealing surface and the axially facing sealing surface toward a sealing position.

23 Claims, 4 Drawing Sheets

ROTATING TURBOMACHINE SEAL

BACKGROUND

This disclosure relates generally to a turbomachine and, more particularly, to sealing areas of a turbomachine.

Turbomachines are well known. Turbomachines typically include a fan section, a compressor section, a combustor section, a turbine section, and an exhaust section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections.

Turbomachines generate significant amounts of thermal energy during operation. Components within the turbomachine may become stressed if exposed to extremely varied levels of thermal energy. Some turbomachines reduce such stress by diverting relatively hot air from the flow path of the compressor section toward other areas of the compressor section. The diverted air heats the other areas, which lessens the thermal energy variations within the compressor section.

In some turbomachines, seals contact components, such as a rotor disk, to restrict flow of the diverted air. High contact stresses between the seal and the rotor disk can damage the seal, the rotor disk, or both. Adhesive wear and fretting wear are examples of such damage.

SUMMARY

An exemplary turbomachine seal assembly includes a ring seal that has a radially-facing sealing surface, an axially-facing sealing surface, and a first tapered surface. The turbomachine seal assembly also includes a spacer that has a second tapered surface. The second tapered surface interfaces with the first tapered surface to bias the radially facing sealing surface and the axially facing sealing surface toward a sealing position.

An exemplary turbomachine sealing assembly includes a rotor assembly that establishes a circumferential groove. A ring seal is at least partially received within the circumferential groove. A spacer is also received with the circumferential groove. The spacer holds the ring seal in a sealed position to limit flow of a fluid from a first axial side of the circumferential groove to a second opposite axial side of the circumferential groove.

An example turbomachine rotor assembly sealing method includes positioning a seal at least partially within a circumferential groove of the rotor assembly and wedging a spacer to bias the seal radially and axially. The method limits flow of fluid past the groove using the seal

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
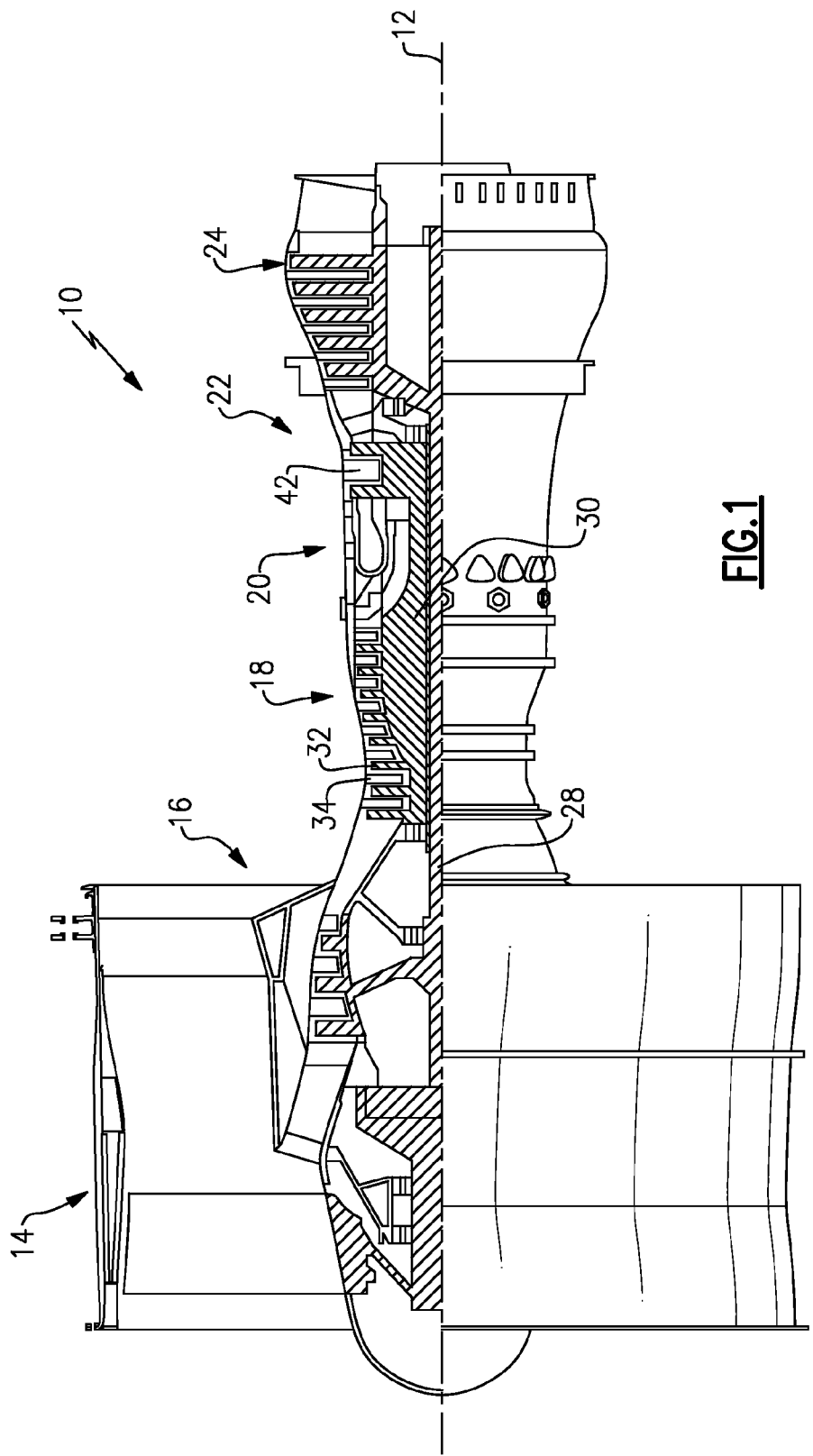
FIG. 1 shows a section view of an example turbomachine.

Referring to FIG. 1, an example turbomachine, such as a gas turbine engine 10, is circumferentially disposed about an axis 12. The gas turbine engine 10 includes a fan section 14, a low-pressure compressor section 16, a high-pressure compressor section 18, a combustor section 20, a high-pressure turbine section 22, and a low-pressure turbine section 24. Other turbomachines include more or fewer sections.

During operation, air is compressed in the low-pressure compressor section 16 and the high-pressure compressor section 18. The compressed air is mixed with fuel and burned in the combustor section 20. The products of combustion are expanded across the high-pressure turbine section 22 and the low-pressure turbine section 24.

A rotor 28 extends from the low-pressure turbine section 24 to the low-pressure compressor section 16. The low-pressure turbine section 24 rotatably drives the low-pressure compressor section 16 and the fan section 14 via the rotor 28.

A rotor 30 extends from the high-pressure turbine section 22 to the high-pressure compressor section 18. The high-pressure turbine section 22 rotatably drives the high-pressure compressor section 18 via the rotor 30.

The rotors 28 and 30 rotate about the axis 12. The rotors 28 and 30 include alternating rows of rotating airfoils or rotating blades 32 and static airfoils or static blades 34.

The examples described in this disclosure are not limited to the two-spool gas turbine architecture described, and may be used in other architectures, such as a single-spool axial design, a three-spool axial design, and still other architectures. That is, there are various types of gas turbine engines, and other turbomachines, that can benefit from the examples disclosed herein.

Figure 2:
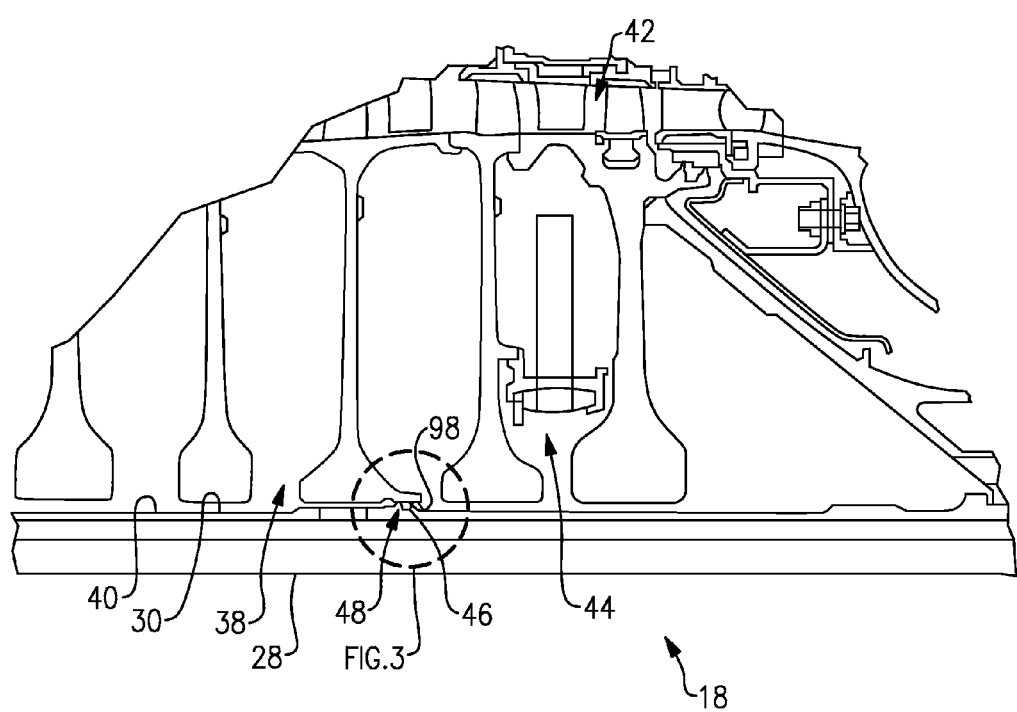
FIG. 2 shows a close-up view of the high pressure compressor section of the FIG. 1 turbomachine.
Figure 3:
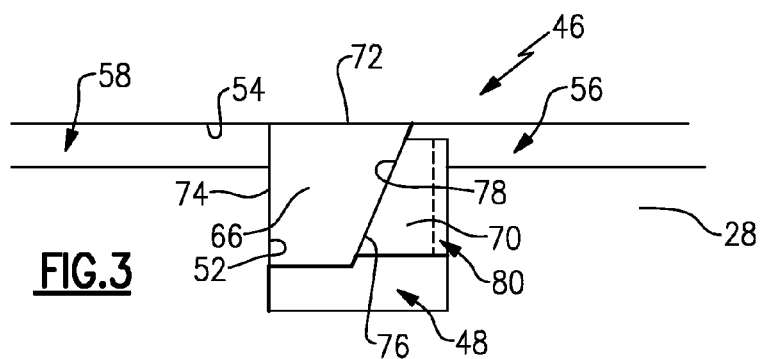
FIG. 3 shows a close-up view of a turbomachine seal assembly at area 3 in the FIG. 2 compressor section.
Figure 4:
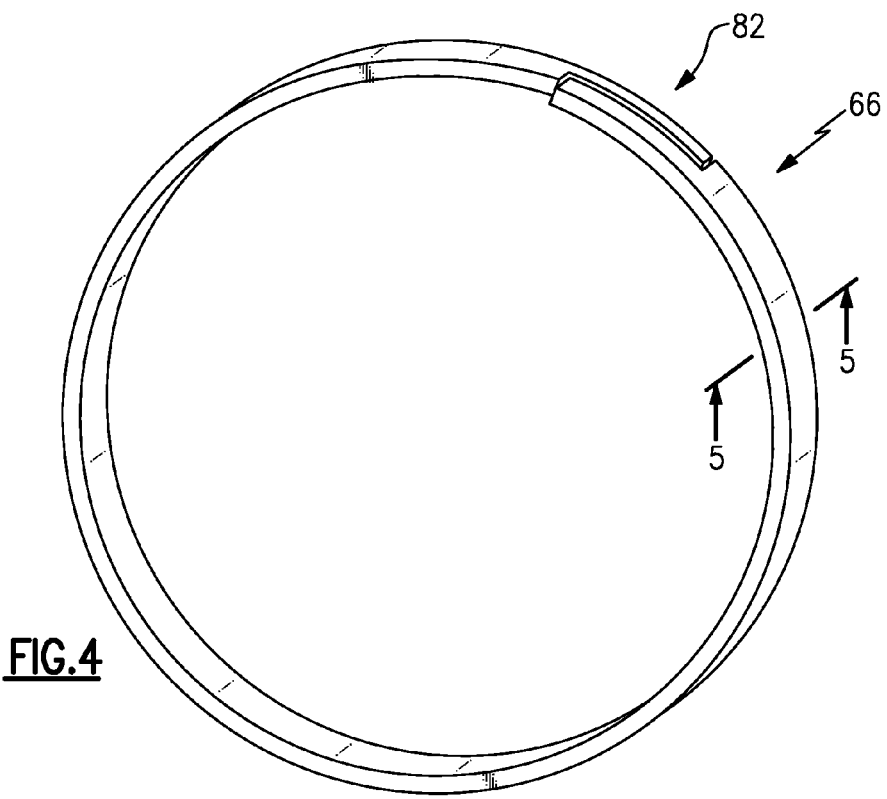
FIG. 4 shows a perspective view of a ring seal of the FIG. 3 turbomachine seal assembly.
Figure 5:
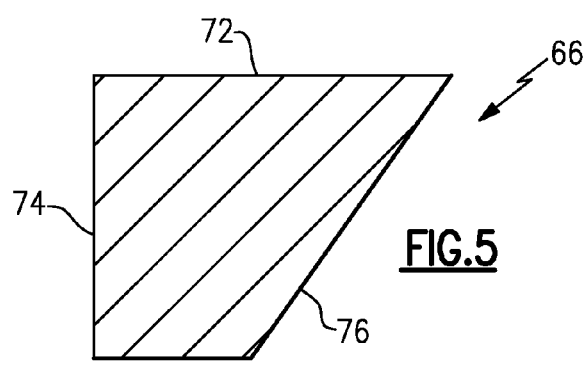
FIG. 5 shows a section view at line 5-5 in FIG. 4.
Figure 6:
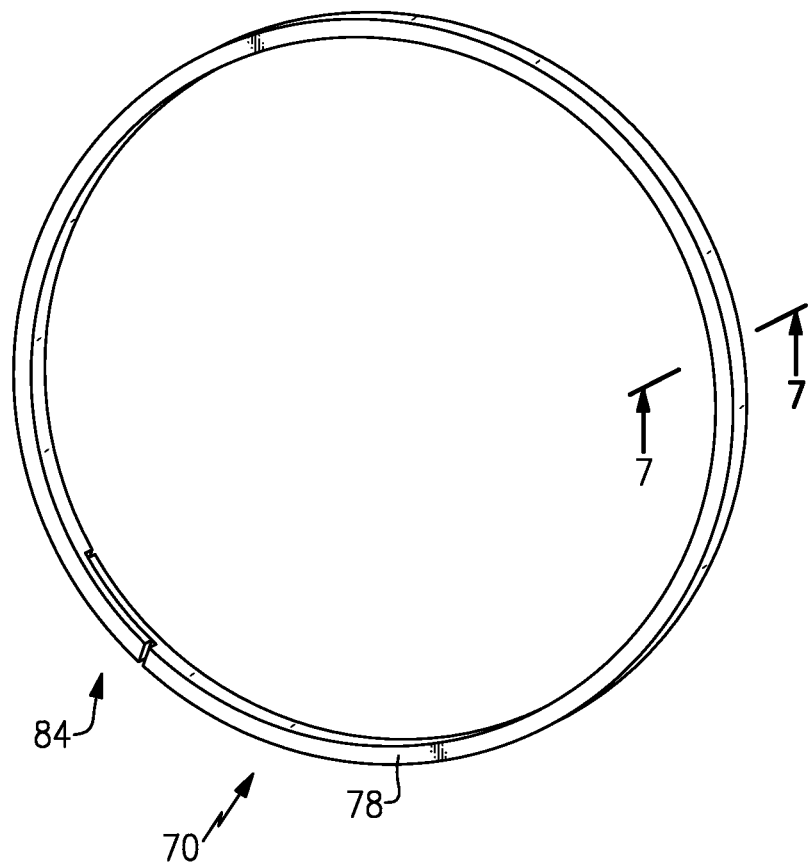
FIG. 6 shows a perspective view of a spacer of the FIG. 3 turbomachine seal assembly.
Figure 7:
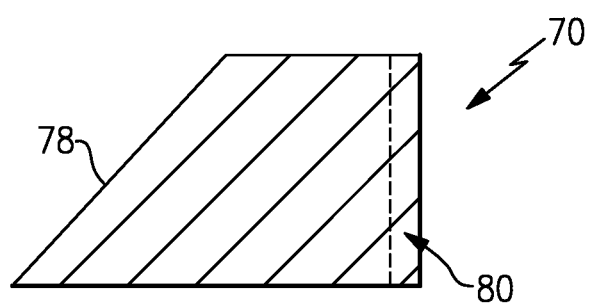
FIG. 7 shows a section view at line 7-7 in FIG. 6.

Referring to FIGS. 2-3 with continuing reference to FIG. 1, a rotor bore 38 is established within the high-pressure compressor section 18. A tie shaft 40 of the rotor 30 is received within the rotor bore 38. The tie shaft 40 joins the integral disks or blades of the high-pressure compressor section 18. The example high-pressure compressor 18 is an eight-stage compressor.

Air from a flow path 42 of the high-pressure compressor 18 is introduced into the rotor bore 38 at an area 44. The introduced air is used to heat the radially inner portions of the aft-most stages of the high-pressure compressor 18. Heating these areas lessens the thermal gradient experienced by the disks of these stages.

A turbomachine seal assembly 46 prevents the flow of the hot air introduced at the area 44 from entering undesired stages of the high-pressure compressor 18. In this example, the seal assembly 46 prevents the flow from entering stages of the high-pressure compressor 18 axially forward the seal assembly 46 (stages 1-5). These stages are exposed to lower levels of thermal energy than stages 6-7. Stages 1-5 thus do not require heating. As can be appreciated, some portions of stage 5 are heated because the seal assembly 46 separates portions of stage 5.

The example turbomachine seal assembly 46 is at least partially received within a groove 48 established within the tie shaft 40. The groove 48 extends circumferentially about the tie shaft 40.

The turbomachine seal assembly 46 contacts both an axially facing surface 52 of the groove 48 and a radially inner diameter 54 of the rotor bore 98 to limit movement of air introduced at area 44.

The air introduced at the area 44 moves through a channel 56 to contact the seal assembly 46. Air in the other areas of the high-pressure compressor 18 moves through a channel 58 to contact the seal assembly 46. The air in the channel 56 has a higher pressure than the air in the channel 58. The higher pressure air in the channel 56 helps bias the seal assembly 46 against the axially facing surface 52 and the inner diameter of the rotor bore 38.

The turbomachine seal assembly 46 includes a ring seal 66 and a spacer 70. In this example, the spacer 70 is made of a different material than the ring seal 66. In one specific example, the spring seal is made of an electrographitic carbon, and the spacer 70 is an austenitic stainless steel, such as a cold-worked AISI 304 or AISI 321. The spacer 70 is a nitrogen modified Nitronic 50 in another example. Other examples include other combinations of metal and non-metal materials used for the seal ring 66 and spacer 70.

In some examples, the spacer 70 and the ring seal 66 are made of the same material, but one of the spacer 70 or the ring seal 66 is coated with another material to prevent galling and to ensure a low friction coefficient between the seal ring 66 and spacer 70, which facilitates free movement of the seal ring 66 and the spacer 70 relative to each other.

The example ring seal 66 includes a radially facing sealing surface 72, an axially facing sealing surface 74, and a first tapered surface 76. The radially facing sealing surface 72 contacts, and seals against, the inner diameter 54. The axially facing sealing surface 74 contacts, and seals against, the axially facing surface 52 of the groove 48. The tapered surface 70 is angled about 30 degrees from both the radially facing surface 72 and the axially facing surface 74. The specific angle is selected based on the ring materials, the differential pressure from channel 56 to channel 58, the rotational speed of the assembly and other factors. The tapered surface 70 has an angle greater than or less than 30 degrees in other examples.

The example spacer 70 includes a second tapered surface 78. When the spacer 70 is moved against the ring seal 66, the second tapered surface 78 is forced against the first tapered surface 76 of the ring seal 66. This contact drives the radially facing sealing surface 72 against the inner diameter 54, drives the axially facing sealing surface 74 against the axially facing surface 52 of the groove 48, or both. The first tapered surface 76 is larger than the second tapered surface 78, in this example. The second tapered surface 78 has the same angle as the first tapered surface 76.

The example spacer 70 includes a plurality of radially directed slots 80. The higher-pressure air from the channel 56 moves through the slots 80 further radially into the circumferential groove 48. Other examples of the spacer 70 do not include the slots 80. The slots 80 face away from the axially facing sealing surface 74 in this example. The slots 80 are established in an axially facing surface of the spacer 70.

The turbomachine seal assembly 46 rotates together with the rotor 30 during operation of the engine 10. Centrifugal forces cause the spacer 70 to be forced (or wedged) against the ring seal 66, which cause the ring seal 66 to seal against the inner diameter 54 and the axially facing surface 52. The higher pressure air from the channel 56 also helps force the spacer 70 against the ring seal 66.

In some examples, the spacer 70 is biased radially outward when installed to further help force the spacer 70 against the ring seal 66.

In other examples, the ring seal 66 and the spacer 70 are biased radially inward. Biasing the ring seal 66 and the spacer 70 radially inward in this way limits contact between the turbomachine seal assembly 46 and the inner diameter 54 during assembly, which could cause potential damage to either component. During operation, centrifugal force overcomes the radially inward bias.

Referring now to FIGS. 4-7 with continuing reference to FIGS. 1-3, the ring seal 66 and the spacer 70 are both split to facilitate assembly of the turbomachine seal assembly 46 about the tie shaft 40.

In this example, the ring seal 66 includes a split 82. The example split 82 causes the ring seal 66 to have a shiplap configuration. A split 84 of the spacer 70 also has a shiplap configuration. The shiplap of the splits 82 and 84 complicates a potential leak path at the splits 82 and 84 making it more difficult for air to move through the splits 82 and 84.

When installed, the split 82 of the ring seal 66 may be rotated 180° from the split 84 of the spacer 70. This arrangement further complicates a potential leak path though through the splits 82 and 84.

A primary feature of the examples disclosed herein is maintaining constant contact between axial surface 74 of seal ring 66 and axial surface 52 of the circumferential groove 54 in the event of axial movement of the groove 54 relative to the rotor bore 98. Such relative movement might be caused by differences in thermal expansion at various operating conditions of the compressor 18.

In many of the prior art designs, the centrifugal force due to rotation of a piston ring seal will hold the seal against the bore 98. Movement of the tie shaft relative to the rotor bore then causes the seal to move axially relative to the circumferential groove, which moves the axial surface of the seal ring away from the axial surface of the circumferential groove to create a leak path.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A turbomachine seal assembly comprising:
   a ring seal that has a radially-facing sealing surface, an axially-facing sealing surface, and a first tapered surface; and
   a spacer that has a second tapered surface, wherein the second tapered surface interfaces with the first tapered surface to bias the radially-facing sealing surface and the axially-facing sealing surface toward a sealing position, wherein the spacer includes a plurality of slots extending from a radially innermost face of the spacer to a radially outermost face of the spacer.

2. The turbomachine seal assembly of claim 1, wherein the first tapered surface is transverse to the axially-facing sealing surface and the radially-facing sealing surface.

3. The turbomachine seal assembly of claim 1, wherein the slots are radially extending slots established in an axially-facing surface of the spacer, the axially-facing surface of the spacer and the axially-facing sealing surface facing in opposite directions.

4. The turbomachine seal assembly of claim 1, wherein the first tapered surface is larger than the second tapered surface.

5. The turbomachine seal assembly of claim 1, wherein the ring seal and the spacer are made of dissimilar materials.

6. The seal assembly of claim 1, wherein the ring seal has a split having a shiplap joint.

7. The turbomachine sealing assembly of claim 1, wherein each of the plurality of slots are open at opposing radial ends.

8. The turbomachine sealing assembly of claim 1, wherein the spacer has a radial height that is less than a radial depth of the circumferential groove.

9. The turbomachine sealing assembly of claim 1, wherein portions of the first tapered surface terminate at the radially-facing sealing surface and the axially-facing sealing surface.

10. The turbomachine sealing assembly of claim 1, wherein the first tapered surface interfaces directly with the radially-facing sealing surface and the axially-facing sealing surface.

11. A turbomachine sealing assembly comprising:
a rotor assembly that establishes a circumferential groove;
a ring seal at least partially received within the circumferential groove; and
a spacer at least partially within the circumferential groove, the spacer holding the ring seal in a sealed position that limits flow of a fluid from a first axial side of the circumferential groove to a second opposite axial side of the circumferential groove, wherein the spacer provides a plurality of slots that communicate some of the fluid from a first radial side of the spacer to a second radial side of the spacer.

12. The turbomachine sealing assembly of claim 11, wherein ring seal has a radially-facing surface and an axially facing surface, the radially-facing surface sealing against an inner diameter of a rotor bore when the ring seal is in the sealed position, the axially-facing surface sealing against an edge of the rotor.

13. The turbomachine sealing assembly of claim 11, wherein the ring seal and the spacer contact opposing axial sides of the circumferential groove when the ring seal is in the sealed position.

14. The turbomachine sealing assembly of claim 11, wherein the rotor assembly defines a fluid flow path, and the ring seal limits flow of the fluid along the fluid flow path.

15. The turbomachine sealing assembly of claim 11, wherein the spacer is held in the sealed position by a pressurized fluid.

16. The turbomachine sealing assembly of claim 11, wherein the rotor assembly, the seal, and the spacer are configured to rotate together.

17. The turbomachine sealing assembly of claim 11, wherein each of the plurality of slots extend radially from an innermost face of the spacer to a radially outermost face of the spacer.

18. The turbomachine sealing assembly of claim 11, wherein the spacer has a radial height that is less than a radial depth of the circumferential groove.

19. A turbomachine rotor assembly sealing method including:
positioning a seal at least partially within a circumferential groove of a rotor assembly;
wedging a spacer to bias the seal radially and axially;
limiting flow of a fluid past the groove using the seal; and
communicating some of the fluid from a first radial side of the spacer to an opposing second radial side of the spacer within the circumferential groove.

20. The turbomachine rotor assembly sealing method of claim 19, including wedging the spacer using the fluid within the circumferential groove.

21. The turbomachine rotor assembly sealing method of claim 19, including biasing a radially-facing surface of the seal radially against an outer rotor, and biasing an axially-facing surface of the seal axially against an axial surface of the groove.

22. The turbomachine rotor assembly sealing method of claim 19, including wedging the spacer using centrifugal force.

23. The turbomachine rotor assembly sealing method of claim 19, including communicating some of the fluid through slots in the spacer.

* * * * *